United States Patent [19]

Raue et al.

[11] Patent Number: 4,542,223
[45] Date of Patent: Sep. 17, 1985

[54] PROCESS FOR THE PREPARATION OF CATIONIC METHINE DYESTUFFS

[75] Inventors: Roderich Raue; Hans-Peter Kühlthau, both of Leverkusen; Klaus-Friedrich Lehment, Odenthal, all of Fed. Rep. of Germany

[73] Assignee: Bayer Aktiengesellschaft, Leverkusen, Fed. Rep. of Germany

[21] Appl. No.: 475,014

[22] Filed: Mar. 14, 1983

[30] Foreign Application Priority Data

Mar. 23, 1982 [DE] Fed. Rep. of Germany ....... 3210596

[51] Int. Cl.$^4$ .................. C07D 209/14; C07D 209/18; C07D 403/06
[52] U.S. Cl. ..................... 548/455; 548/511; 548/467
[58] Field of Search ............... 548/506, 511, 455, 467; 542/457, 466

[56] References Cited

U.S. PATENT DOCUMENTS

| | | | |
|---|---|---|---|
| 2,230,789 | 2/1941 | Winter et al. | 8/539 |
| 3,346,571 | 10/1967 | Spatz et al. | 548/511 X |
| 3,379,723 | 4/1968 | Clarke | 8/539 |
| 3,514,453 | 5/1970 | Spatz et al. | 542/466 |
| 3,541,089 | 11/1970 | Hoseltine et al. | 548/511 X |
| 3,888,850 | 6/1975 | Entschel et al. | 8/539 |
| 3,925,015 | 12/1975 | Kuhlthau | 8/539 |
| 3,980,430 | 9/1976 | Kuhlthau | 8/539 |
| 4,042,322 | 8/1977 | Kuhlthau | 8/539 |

FOREIGN PATENT DOCUMENTS 1577842 10/1980 United Kingdom .

Primary Examiner—Glennon H. Hollrah
Assistant Examiner—D. B. Springer
Attorney, Agent, or Firm—Sprung Horn Kramer & Woods

[57] ABSTRACT

Methine dyestuffs of the formula

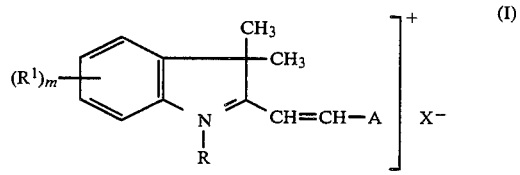

are prepared by subjecting a compound

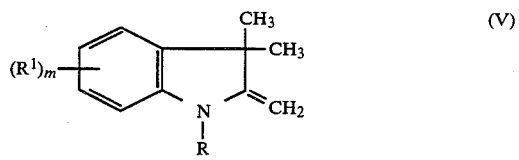

to a condensation reaction with a compound

A—CHO          (VI)

and with 1 to 5 equivalents of an inorganic acid in the presence of 0–30% by weight of an organic solvent and 0–15% by weight of water.

5 Claims, No Drawings

PROCESS FOR THE PREPARATION OF CATIONIC METHINE DYESTUFFS

The invention relates to a process for the preparation of cationic methine dyestuffs of the general formula

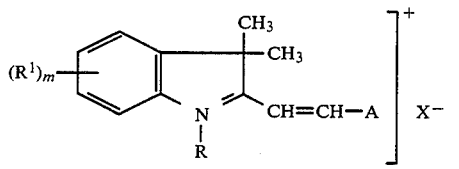   (I)

in which

R represents an alkyl radical which has 1 to 4 C atoms and is optionally substituted by hydroxyl, alkoxy having 1 to 4 C atoms, acyloxy, halogen, cyano, carboxyl, $C_1$ to $C_4$-carboalkoxy, carbon-amido or acetyl, $R^1$ represents hydrogen, alkyl having 1 to 4 C atoms, halogen, alkoxy having 1 to 4 C atoms, hydroxyalkoxy having 2 to 4 C atoms, a phenoxy, benzyloxy or benzyl radical which is optionally substituted by halogen, $C_1$ to $C_4$-alkyl or $C_1$ to $C_4$-alkoxy, carboxyl, a carboxylic acid alkyl ester which has 1 to 4 C atoms, a carbon-amide group which is optionally substituted by 1 or 2 $C_1$ to $C_4$-alkyl radicals, a sulphonamide group which is optionally substituted by 1 or 2 $C_1$ to $C_4$-alkyl radicals, alkylsulphonyl having 1 to 4 C atoms, phenylsulphonyl or a cyano, trifluoromethyl, acetyl or benzoyl group, A represents a radical of the formula

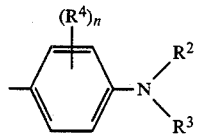   (II)

in which the radicals $R^2$ and $R^3$ independently of one another represent an alkyl radical which has 1 to 4 C atoms and is optionally substituted by hydroxyl, $C_1$ to $C_4$-alkoxy, halogen, cyano, phenyl, carboalkoxy having 1 to 4 C atoms, carbon-amido, acyloxy, benzyloxy, sulphonamido or acylamino, $R^2$ additionally represents a phenyl or benzyl radical which is optionally substituted by halogen, $C_1$ to $C_4$-alkyl or $C_1$ to $C_4$-alkoxy, or, together with the adjacent C atom of the benzene ring, can form a partially hydrogenated 5-membered or 6-membered ring which contains N and optionally contains O, and $R^4$ denotes hydrogen, an alkyl radical having 1 to 4 C atoms, an alkoxy radical having 1 to 4 C atoms or halogen, or A represents a radical of the formula

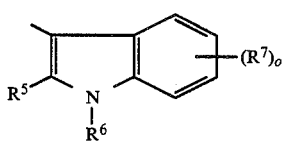   (III)

in which $R^5$ represents an alkyl radical having 1 to 4 C atoms, a phenyl radical which is optionally substituted by halogen, $C_1$ to $C_4$-alkyl or $C_1$ to $C_4$-alkoxy, or a carboalkoxy radical having 1 to 4 C atoms, $R^6$ represents hydrogen, an alkyl radical which has 1 to 4 C atoms and is optionally substituted by hydroxyl, halogen, alkoxy having 1 to 4 C atoms, cyano or acyloxy, and $R^7$ represents hydrogen, halogen, $C_1$ to $C_4$-alkyl, $C_1$ to $C_4$-alkoxy, carboalkoxy having 1 to 4 C atoms, $C_1$ to $C_4$-alkylsulphonyl, phenylsulphonyl, acetyl or benzoyl, or A represents a radical of the formula

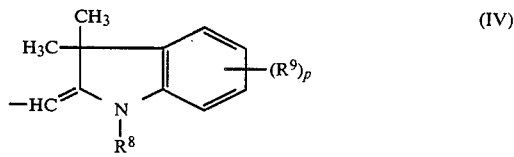   (IV)

in which $R^8$ and $R^9$ independently of one another have the same meaning as R and $R^1$, respectively, in formula (I), $X^-$ denotes the radical of an inorganic acid and m, n, o and p independently of one another denote 1 to 4, by subjecting a compound of the formula

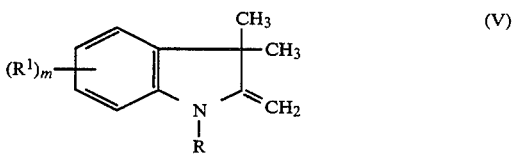   (V)

in which R, $R^1$ and m have the same meaning as in formula (I)

to a condensation reaction with a compound of the formula

A—CHO   (VI)

in which

A has the meaning indicated in formula (I), and with acids, characterised in that the condensation reaction is carried out using 1 to 5 equivalents of an inorganic acid in the presence of 0–30% by weight of an organic solvent and 0–15% by weight of water (both the weights quoted relating to the total weight of the components V and VI).

A preferred group of dyestuffs which can be prepared by the new process corresponds to the general formula

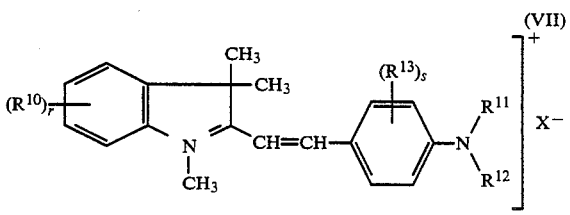   (VII)

in which $R^{10}$ represents hydrogen, chlorine, methyl, methoxy, ethoxy or carbomethoxy, $R^{11}$ and $R^{12}$ independently of one another represent an alkyl radical which has 1 to 4 C atoms and is optionally substituted by hydroxyl, methoxy, ethoxy, chlorine, cyano, phenyl or acyloxy, and $R^{11}$ additionally indicates a phenyl radical which is optionally substituted by chlorine, methyl or methoxy, or, together with the adjacent C atom of the benzene ring, can form a 5-membered or 6-membered partially hydrogenated ring which contains N and optionally contains 0, $R^{13}$ denotes hydrogen, methyl, chlorine, methoxy or ethoxy, r and s denote 1 or 2 and $X^-$ has the same meaning as in formula (I).

In particular, equimolar quantities of the compounds (V) and (VI) are reacted.

In the above formulae, halogen preferably represents fluorine, chlorine or bromine.

Acyl is to be understood as meaning especially acetyl, propionyl, benzoyl or carbamoyl.

If the radicals $R^2$ and $R^{11}$ are cyclised to form a ring with the carbon atom of the benzene ring in the o-position in relation to the nitrogen atom, they can, together with the benzene ring and the nitrogen atom, form, for example, an indoline, tetrahydroquinoline, phenomorpholine or tetrahydroquinoxaline ring which is optionally substituted by $C_1$-$C_4$-alkyl.

The reaction is carried out in a solid phase reactor equipped with rotating internal fitments.

Screw reactors, kneading apparatus, paddle driers or an all-phase reactor, which is described, for example, in "Chemische Rundschau" 26 (1973), page 7, are particularly suitable.

The advantage of the new process consists in the fact that the dyestuff is obtained directly, in a form ready for sale, without passing through an aqueous phase from which the dyestuff has to be isolated by salting out, filtering off and drying. Hence no effluent is produced in the new process, and the Labour-intensive and energy-intensive drying of the dyestuff isolated from the solution is eliminated.

If a paddle drier is used as the reaction vessel, standardised dyestuffs ready for sale can be obtained directly by adding the standardising agent customarily added, such as sodium sulphate, sodium chloride or dextrin, before, during or after the reaction. It is advantageous to add inorganic salts, especially sodium sulphate, as early as the start of the reaction, since the formation of incrustations on the reactor wall is prevented thereby.

A further, surprising advantage consists in the fact that the reaction takes place virtually quantitatively under the conditions according to the invention, so that the dyestuffs are obtained in a surprisingly high degree of purity without a further purification process.

Intermediate products of the formulae (V) and (VI) which are suitable for the process are to be found in many patent specifications, the following, inter alia, may be mentioned: German Patent Specification Nos. 614,325, 615,130, 711,665, 721,020, 730,336, 742,039, 744,019, 891,120, 1,070,316 and 1,099,670, German Auslegeschriften Nos. 1,044,022, 1,049,994, 1,158,646, 1,569,734, 2,031,202, 2,040,872 and 2,234,468, German Offenlegungsschriften Nos. 1,929,417, 2,040,652, 2,040,653, 2,064,881, 2,064,882, 2,101,223, 2,130,790, 2,135,834, 2,200,027, 2,202,300, 2,243,627 and 2,726,437, U.S. Pat. Nos. 2,815,338, 3,394,130, 3,865,837 and 3,888,850, Japanese Patent Specification Nos. 3,217-69, 13,748-66, 19,951-65, 49 14,525, 49 72,477, 49 74,217, 50 05,863, 73 12,460, 73 13,752, 74 04,531 and 76 35,405, French Patent Specification No. 1,261,976 and Belgian Patent Specification No. 734,765.

Examples of inorganic acids which are particularly suitable are sulphuric acid, orthophosphoric acid, pyrophosphoric acid, polyphosphoric acid, and sulphamic acid, and also the acid salts of polybasic acids, such as sodium bisulphate, potassium bisulphate and primary sodium phosphate.

In addition, hydrochloric acid, hydrobromic acid and nitric acid are suitable.

The various phosphoric acids are particularly preferred acids, so that $X^-$ represents the radical of these acids, in particular.

The reaction can be carried out in the presence of an organic solvent, which is removed again from the reaction apparatus by distillation during the reaction or after the reaction is complete.

The following are suitable organic solvents: toluene, xylene, chlorobenzene, dichlorobenzene, acetone, tetrahydrofuran, dioxane and dimethylglycol.

However, the advantage of the new process consists precisely in the fact that in most cases it is possible to dispense with the use of a solvent.

The content of water by weight is advantageously not more than 5% of the total of the components V and VI.

The reaction is carried out at temperatures between 40° and 120° C., the temperature range from 60° to 100° C. being preferred.

The dyestuff salts which have been prepared in accordance with the invention are suitable for dyeing cotton which has been mordanted with tannic acid, and acid-modified polyamide and polyester fibres, but are particularly suitable for dyeing fibre materials composed of polyacrylonitrile. They are also suitable for dyeing paper containing mechanical wood pulp, and leather and for the production of ball-point pen pastes, inks and stamp pad inks.

EXAMPLE 1

875 g of 1,3,3-trimethyl-2-methyleneindoline are stirred with 873 g of 4-diethylaminobenzaldehyde in a laboratory paddle drier of capacity approx. 3 liters until the mixture is homogeneous. 494 g of concentrated sulphuric acid are then added dropwise. The melt is stirred further at 95°-100° C. It crystallises after about 30 minutes, the temperature rising to 107° C. The apparatus is operated for a further 2 hours at 100° C. This gives 2,242 g of the dyestuff of the formula

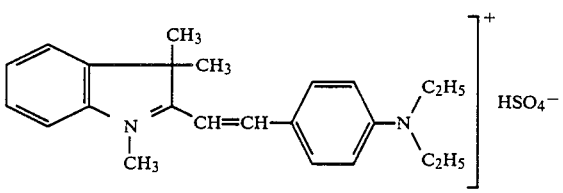

in the form of a finely ground powder which dyes polyacrylonitrile in a red having a strong bluish tinge (C.I. Hue Indication Chart No. 10).

If an equimolecular quantity of 1,3,3,5-tetramethyl-2-methyleneindoline, 1,3,3-trimethyl-5-chloro-2-methyleneindoline, 1,3,3-trimethyl-5-methoxy-2-methyleneindoline, 1,3,3-trimethyl-5,7-dichloro-2-methyleneindoline or 1,3,3-trimethyl-5-chloro-7-methoxy-2-methyleneindoline is used instead of 1,3,3- trimethyl-2-methyleneindoline and if the procedure followed is otherwise identical, the corresponding dyestuffs are obtained in the form of their bisulphate salts, which dye polyacrylonitrile materials in brilliant red shades.

EXAMPLE 2

346 g of 1,3,3-trimethyl-2-methyleneindoline and 298 g of 4-dimethylaminobenzaldehyde are mixed at room temperature in a laboratory paddle drier of capacity approx. 3 liters, equipped with beater rods. 200 g of concentrated sulphuric acid are then added dropwise, in the course of which the melt heats up to 104° C. It crystallises after being stirred for about 4 minutes more and is then ground for 1 hour at 100° C. in the paddle drier to give a fine powder, which constitutes the dyestuff of the formula

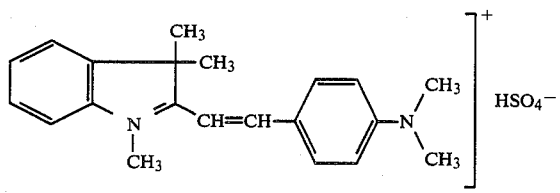

and dyes polyacrylonitrile red (C.I. Hue Indication Chart No. 9).

EXAMPLE 3

298 g of 4-dimethylaminobenzaldehyde are mixed with 415 g of 1,3,3-trimethyl-5-chloro-2-methyleneindoline at room temperature in a laboratory paddle drier and 200 g of concentrated sulphuric acid are then added dropwise. In the course of this, the temperature of the melt rises to 70° C. and, after a further 5 minutes reaches 106° C., whereupon the melt crystallises. It is ground at 95° C. for 2.5 hours. The dyestuff obtained has the formula:

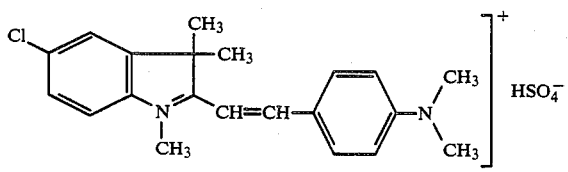

It dyes polyacrylonitrile in a reddish-tinged violet (C.I. Hue Indication Chart No. 10).

EXAMPLE 4

415 g of 1,3,3-trimethyl-5-chloro-2-methyleneindoline are mixed with 354 g of 4-diethylaminobenzaldehyde in a laboratory paddle drier. 200 g of concentrated sulphuric acid are then added dropwise. The temperature of the melt rises to 67° C. The mixture is warmed to 95° C. After 5 minutes, the dyestuff crystallises, while the temperature rises to 106° C. The paddle drier is operated for a further 4 hours at 95° C., the dyestuff of the formula

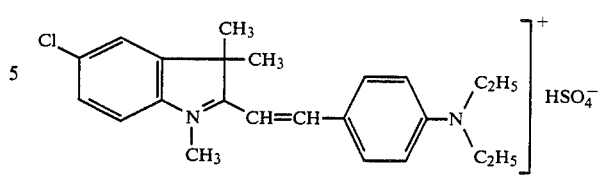

being obtained as a finely ground powder, which dyes polyacrylonitrile violet (C.I. Hue Indication Chart No. 11).

EXAMPLE 5

1,120 g of 4-(N-ethyl-N,β-chloroethylamino)-2-methylbenzaldehyde, 875 g of 1,3,3-trimethyl-2-methyleneindoline and 500 g of toluene are mixed by stirring at room temperature in a laboratory paddle drier. 480 g of concentrated sulphuric acid are then added dropwise, in the course of which the mixture warms up to 74° C. During the subsequent stirring at 70° C., the mass melts and crystallises after a total of 3 hours. The dyestuff is ground for a further 6 hours at 70° C. and, in the course of this the toluene is distilled off under reduced pressure. The resulting powder constitutes the dyestuff of the formula

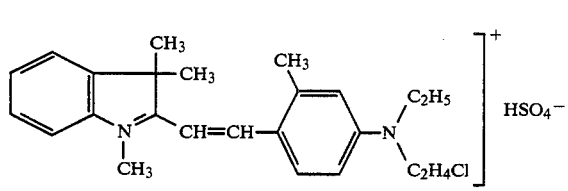

and dyes polyacrylonitrile bluish-tinged red (C.I. Hue Indication Chart No. 11).

EXAMPLE 6

440 g of 4-(N-methyl-N,β-chloroethylamino)-benzaldehyde and 394 g of 1,3,3-trimethyl-2-methyleneindoline are mixed at 50° C. in a paddle drier. 462 g of 85% strength orthophosphoric acid are then run in, and the heating fluid of the reactor is then warmed to 100° C. When this temperature has been reached, the dyestuff begins to crystallise. After stirring for 10 minutes, the water present is removed by distillation under reduced pressure and the product is then ground for 6 hours at 100° C. to give a fine powder. This contains the dyestuffs of the formulae

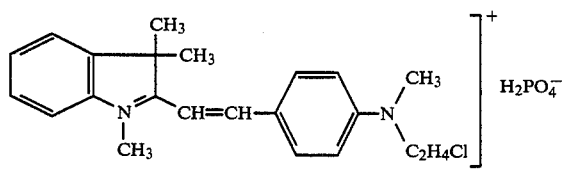

and

-continued

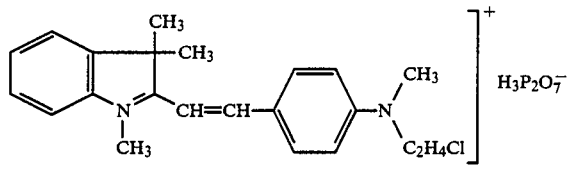

and dyes polyacrylonitrile bluish-tinged red (C.I. Hue Indication Chart No. 50).

If the above procedure is followed, but 400 g of anhydrous sodium sulphate are added to the mixture before the addition of the phosphoric acid, the crystallising melt detaches itself more easily from the reactor wall when being ground. The condensation reaction takes place equally readily.

Instead of 400 g of anhydrous sodium sulphate, it is also possible to use 80 g of an oleyl polyglycol ether in order to achieve easier stripping of the crystallising melt from the reactor wall.

EXAMPLE 7

875 g of 1,3,3-trimethyl-2-methyleneindoline and 987 g of 4-(N-methyl-N,β-chloroethylamino)-benzaldehyde are mixed at 50° C. in a paddle drier, and a mixture composed of 345 g of 85% strength orthophosphoric acid and 492 g of polyphosphoric acid having a 76% content of $P_2O_5$ is then added. At the same time, the heating bath is heated up to 95° C. As early as 2 minutes after the addition of the acid, a mixture of various phosphates of the dyestuff mentioned in Example 6 crystallises. It is ground for 1 hour at 95° C. to give a fine powder and is excellently suitable for dyeing acid-modified synthetic fibres in bluish-tinged red shades (C.I. Hue Indication Chart No. 50).

EXAMPLE 8

376 g of 4-(N-methyl-N,β-cyanoethylamino)-benzaldehyde and 346 g of 1,3,3-trimethyl-2-methyleneindoline are mixed at 30° C. in a laboratory paddle drier, and a mixture composed of 138 g of 85% strength orthophosphoric acid and 197 g of polyphosphoric acid (76% of $P_2O_5$) is then added. In the course of this, the temperature of the melt rises to 95° C. The dyestuff crystallises after stirring for a further 15 minutes. It is ground for 4 hours in the paddle drier to give a fine powder, which consists of a mixture of orthophosphates, pyrophosphates and polyphosphates of the dyestuff of the formula

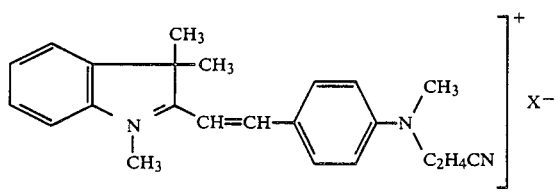

wherein $X^-$ denotes the mixture of phosphate anions of varying composition. The dyestuff powder has an excellent solubility and dyes polyacrylonitrile yellowish-tinged red (C.I. Hue Indication Chart No. 49). The dyestuff contains 0.1% by weight of the aldehyde component and 0.3% by weight of the indoline component.

EXAMPLE 9

354 g of 4-(N,N-diethylamino)-benzaldehyde and 364 g of 1,3,3-trimethyl-2-methyleneindoline are warmed to 50° C. in a paddle drier, and a mixture composed of 138 g of 85% strength orthophosphoric acid and 196.8 g of polyphosphoric acid (76% content of $P_2O_5$) is then run in. At the same time the heating bath is heated up to 90°–100° C. The mixture, which is at first mobile, becomes more viscous in the course of a few minutes and crystallises after 10 minutes, the temperature rising to 115° C. The dyestuff is pulverised by grinding for 5 hours at 95° C. in the paddle drier. It corresponds to the formula

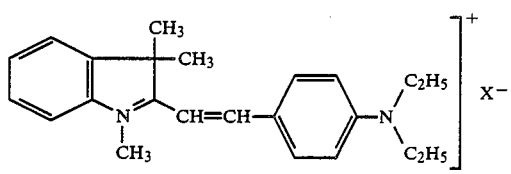

wherein $X^-$ denotes the mixture of orthophosphate and pyrophosphate ions of a varying composition. The dyestuff dyes acid-modified polyester fibres bluish-tinged red (C.I. Hue Indication Chart No. 10).

EXAMPLE 10

875 g of 1,3,3-trimethyl-2-methyleneindoline and 745 g of 4-dimethylaminobenzaldehyde are mixed by stirring at 50° C. in a laboratory paddle drier. A mixture composed of 345 g of 85% strength orthophosphoric acid and 492 g of polyphosphoric acid (76% of $P_2O_5$) is then run in, in the course of which the temperature of the melt rises to 107° C. The dyestuff crystallises shortly afterwards. It is ground for a further 2 hours at 95° C. to give a fine powder. The dyestuff powder corresponds to the formula

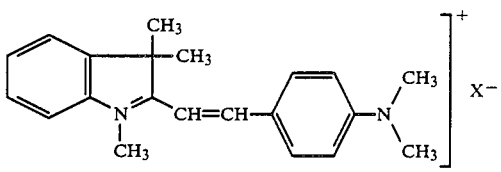

wherein $X^-$ denotes a mixture of orthophosphate, pyrophosphate and polyphosphate anions of a varying composition. The dyestuff is very readily soluble in water and dyes polyacrylonitrile red (C.I. Hue Indication Chart No. 9).

EXAMPLE 11

A dyestuff powder having the same properties as in Example 6 is obtained if the procedure of Example 6 is followed, but employing, instead of 85% strength orthophosphoric acid, a mixture composed of 177 g of 85% strength orthophosphoric acid and 216 g of polyphosphoric acid.

EXAMPLE 12

A dyestuff powder having the same properties as in Example 6 is obtained if the procedure of Example 6 is followed, but employing, instead of 85% strength orthophosphoric acid, 392 g of 100% strength orthophosphoric acid.

EXAMPLE 13

875 g of 1,3,3-trimethyl-2-methyleneindoline and 987 g of 4-(N-methyl-N,β-chloroethylamino)-benzaldehyde are mixed at room temperature in a laboratory paddle drier. 480 g of concentrated sulphuric acid are then added dropwise with stirring and stirring is then continued at 90°–95° C. The melt crystallises after 1 hour. It is ground to give a fine powder by stirring for a further hour, and constitutes the dyestuff of the formula

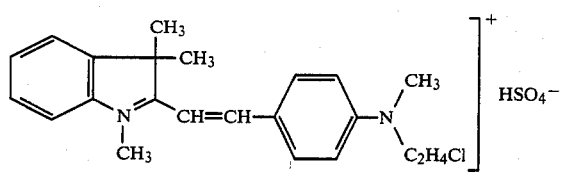

which dyes polyacrylonitrile bluish-tinged red (C.I. Hue Indication Chart No. 50).

EXAMPLE 14

376 g of 4-(N-methyl-N,β-cyanoethylamino)-benzaldehyde and 346 g of 1,3,3-trimethyl-2-methyleneindoline are mixed by stirring at room temperature in a laboratory paddle drier. 200 g of concentrated sulphuric acid are then added dropwise, in the course of which the temperature of the melt rises to 103° C. The dyestuff crystallises after stirring at 95° C. for a further 1.5 hours. Grinding is carried out for approx. 4 hours at 95° C. to give a fine powder. This corresponds to the formula

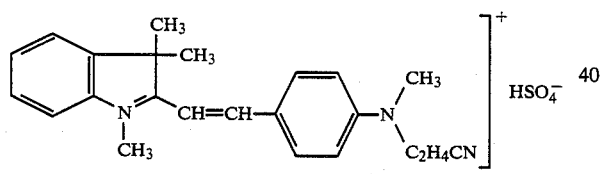

and dyes polyacrylonitrile yellowish-tinged red (C.I. Hue Indication Chart No. 49).

EXAMPLE 15

354 g of 4-diethylaminobenzaldehyde and 350 g of 1,3,3-trimethyl-2-methyleneindoline are mixed in a laboratory paddle driver. 210 g of pure hydrochloric acid are run, while stirring well, into the mixture, which has a temperature of 15° C. In the course of this the resulting melt warms up to 55° C. After stirring for 10 minutes, a waterpump vacuum is applied and the water is distilled off while heating at 80° C. The residue is then ground under vacuum for 10 hours at 65° C. The resulting powder constitutes the dyestuff of the formula

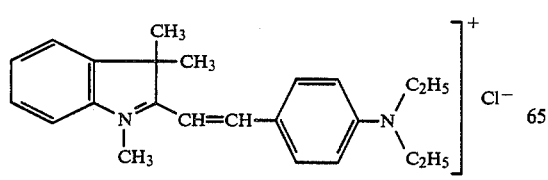

EXAMPLE 16

5 g of 65.3% strength nitric acid are added dropwise with stirring to a mixture composed of 9.1 g of 4-diethylaminobenzaldehyde and 9 g of 1,3,3-trimethyl-2-methyleneindoline. The mixture is stirred for 1 hour at 85° C., a vacuum is then applied and the water is distilled off at 85° C. In the course of this the mass crystallises completely. The condensation reaction is quantitative after stirring for 3 hours at 85° C. The mass constitutes the crystalline dyestuff of the formula

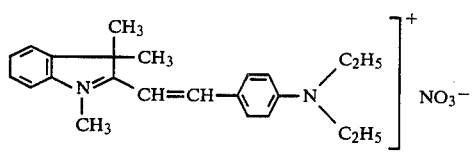

It can readily be ground to give a fine powder and is very suitable for dyeing acid-modified synthetic fibres in a red having a strong bluish tinge (C.I. Hue Indication Chart No. 10).

EXAMPLE 17

376 g of 4-(N-methyl-N,β-cyanoethylamino)-benzaldehyde and 350 g of 1,3,3-trimethyl-2-methyleneindoline are mixed by stirring at 40° C. in a laboratory paddle drier. 210 g of concentrated hydrochloric acid are then run in, while stirring. In the course of this the temperature of the melt rises to 56° C. Stirring is continued for 10 minutes, the mixture is warmed to 80° C. and the water is then distilled off under a waterpump vacuum. The product is then ground in vacuo for 2 hours at 80° C. and subsequently overnight at 65° C. The dyestuff of the formula

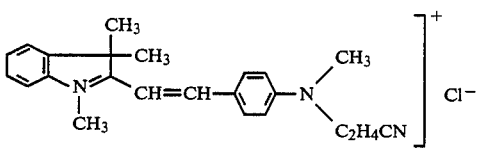

is obtained in the form of a fine powder.

EXAMPLE 18

451 g of 4-(N-ethyl-N,β-chloroethylamino)-2-methylbenzaldehyde and 350 g of 1,3,3-trimethyl-2-methyleneindoline are mixed at 40° C. in a laboratory paddle drier. 210 g of concentrated hydrochloric acid are then run in, the mixture is warmed to 80° C. and the water is then distilled off under a waterpump vacuum. The residue is ground for 4 hours at 80° C. in vacuo and then overnight at 65° C. This gives a fine powder, which constitutes the dyestuff of the formula

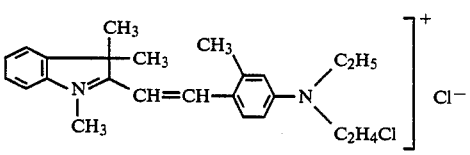

and dyes polyacrylonitrile in a red shade having a strong bluish tinge (C.I. Hue Indication Chart No. 11).

EXAMPLE 19

395 g of 4-(N-methyl-N,β-chloroethylamino)-benzaldehyde and 346 g of 1,3,3-trimethyl-2-methyleneindoline are mixed at 40° C. in a laboratory paddle drier, and 210 g of concentrated hydrochloric acid are then run in. The melt is then heated to 80° C. and the water is distilled off under a waterpump vacuum, while stirring. The residue is then ground for a further 3 hours at 80° C. under vacuum, to give a fine powder of the dyestuff of the formula

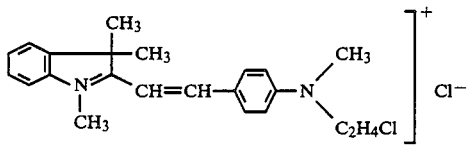

which dyes polyacrylonitrile pink (C.I. Hue Indication Chart No. 50).

EXAMPLE 20

531 g of 4-diethylaminobenzaldehyde, 526.5 g of 1,3,3-trimethyl-2-methyleneindoline and 600 g of anhydrous sodium sulphate are ground in a laboratory paddle drier. 900 g of NaHSO$_4$.H$_2$O are then introduced. Mixing is carried out for 1 hour at 50° C., the mixture is heated to 100° C. and a waterpump vacuum is applied. Grinding overnight gives a finely pulverulent mixture of sodium sulphate and the dyestuff of the formula

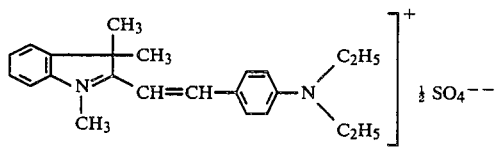

which is very suitable as a dyeing preparation for dyeing acid-modified synthetic fibres in red shades having a strong bluish tinge (C.I. Hue Indication Chart No. 10).

EXAMPLE 21

597 g of 1,3,3-trimethyl-2-methyleneindoline, 694 g of 4-(N-methyl-N,β-cyanoethylamino)-benzaldehyde and 1 kg of Na$_2$SO$_4$ (anhydrous) are mixed in a paddle drier, and 1,020 g of NaHSO$_4$.H$_2$O are then added. The mixture is stirred for 1 hour at 50° C. and is then stirred overnight at 100° C. under a waterpump vacuum. This gives a fine powder, which constitutes a mixture of sodium sulphate and the dyestuff of the formula

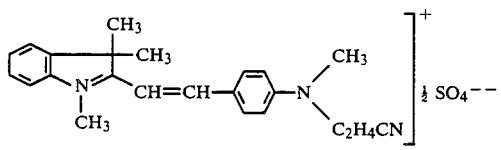

The dyestuff dyes polyacrylonitrile yellowish-tinged red (C.I. Hue Indication Chart No. 49).

EXAMPLE 22

235 g of 1-methyl-2-phenylindole-3-aldehyde and 203 g of 5-methoxy-1,3,3-trimethyl-2-methyleneindoline are mixed in a laboratory paddle drier, and a mixture of 69 g of 85% strength phosphoric acid and 99 g of 76% strength polyphosphoric acid are added at 70° C. The dyestuff is ground for 12 hours at 95° C. under a waterpump vacuum, and is obtained in the form of a brown powder. It corresponds to the formula

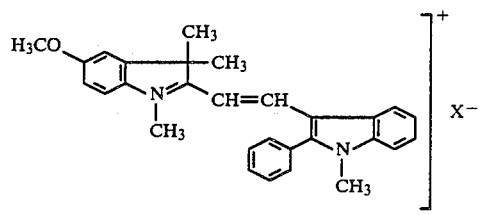

wherein X$^-$ denotes a mixture of orthophosphoric, pyrophosphoric and polyphosphoric acid anions. The dyestuff dyes polyacrylonitrile reddish-tinged orange (C.I. Hue Indication Chart No. 6).

EXAMPLE 23

1,730 g of 1,3,3-trimethyl-2-methyleneindoline are mixed by stirring at 50° C. in a laboratory paddle drier of capacity approx. 5 liters with 1,770 g of 4-diethylaminobenzaldehyde until a homogeneous melt is obtained, and 970 g of sulphamic acid are then introduced. The dyestuff crystallises after 35 minutes. The mixture is heated at 100° C. for a further 3 hours in the paddle drier and for a further hour under a waterpump vacuum. This gives 4,160 g of the dyestuff of the formula

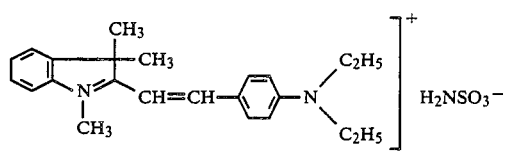

EXAMPLE 24

159 g of 2-methylindole-3-aldehyde are mixed with 173 g of 1,3,3-trimethyl-2-methyleneindoline in a laboratory paddle drier, and 105 g of concentrated hydrochloric acid are then added. The mixture is heated to 95° C., whereupon the melt crystallises after a few minutes. It is stirred overnight at 95° C. and under a waterpump vacuum, in the course of which the dyestuff of the formula

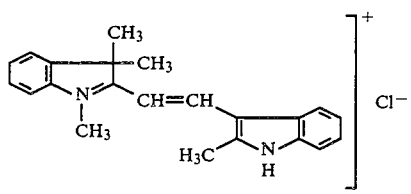

is ground to give a red-brown powder. It dyes acid-modified synthetic fibres yellowish-tinged orange (C.I. Hue Indication Chart No. 4).

EXAMPLE 25

415 g of 1,3,3-trimethyl-2-methyleneindoline-ω-aldehyde and 346 g of 1,3,3-trimethyl-2-methyleneindoline are mixed in a paddle drier, and 196 g of sulphamic acid are then added. The melt is heated to 95° C. and is ground overnight at this temperature under a waterpump vacuum. The resulting blue-red powder contains the dyestuff of the formula

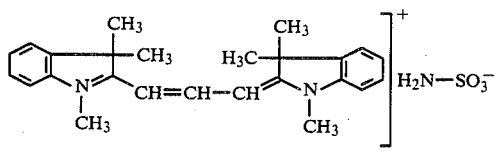

which dyes paper bluish-tinged red (C.I. Hue Indication Chart No. 51).

EXAMPLE 26

505 g of N-methyl-4-ethoxydiphenylamine-4'-aldehyde, 350 g of 1,3,3-trimethyl-2-methyleneindoline, 280 ml of toluene and 1 kg of anhydrous sodium sulphate are mixed at room temperature in a laboratory paddle drier. 196 g of concentrated sulphuric acid are then added in a thin stream in the course of 20 minutes and are stirred into the mixture. Stirring is carried out at 100° for 12 hours, the toluene is then distilled off under reduced pressure and the residue is ground for a further 12 hours at 85° under a waterpump vacuum. This gives the dyestuff of the formula

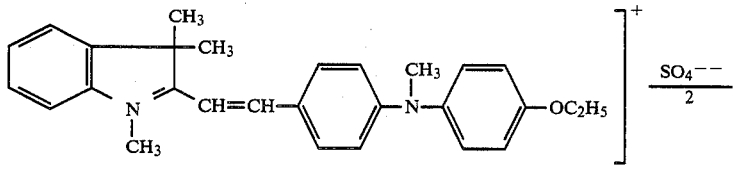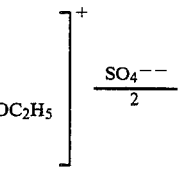

in the form of a fine powder. It dyes polyacrylonitrile reddish-tinged violet (C.I. Hue Indication Chart No. 10).

EXAMPLE 27

475 g of N-methyl-4-ethoxydiphenylamine-4'-aldehyde, 467 g of 1,3,3-trimethyl-5-carbomethoxy-2-methyleneindoline, 300 ml of toluene, 1 kg of anhydrous sodium sulphate and 30 g of a polyglycol ether formed from oleyl alcohol and ethylene oxide are mixed in a laboratory paddle drier, the mixture is heated to 70° and 410 g of 85% strength phosphoric acid are then stirred in. The mixture is then stirred for ½ hour at 95° and for 1.5 hours at 100° and the toluene is then distilled off at this temperature under reduced pressure. The dyestuff of the formula

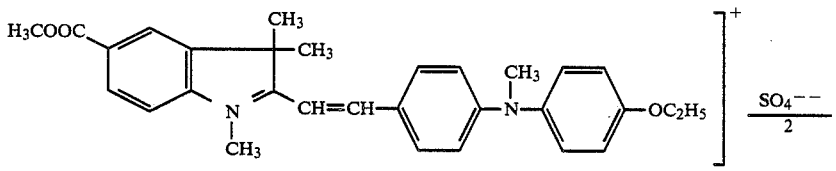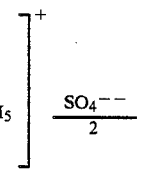

is obtained in the form of a fine powder after grinding overnight at 100° and under a waterpump vacuum. The dyestuff dyes polyacrylonitrile bluish-tinged violet (Hue Indication Chart No. 12).

We claim:

1. In the preparation of cationic methine dyestuffs of the general formula

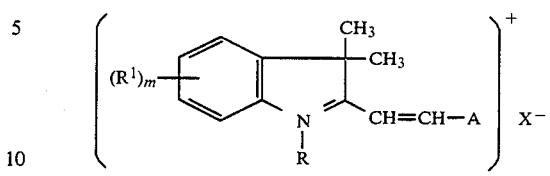

in which

R represents an alkyl radical which has 1 to 4 C atoms and is optionally substituted by hydroxyl, alkoxy having 1 to 4 C atoms, acyloxy, halogen, cyano, carboxyl, $C_1$ to $C_4$-carboalkoxy, carbon-amido or acetyl, $R^1$ represents hydrogen, alkyl having 1 to 4 C atoms, halogen, alkoxy having 1 to 4 C atoms, hydroxyalkoxy having 2 to 4 C atoms, a phenoxy, benzyloxy or benzyl radical which is optionally substituted by halogen, $C_1$ to $C_4$-alkyl or $C_1$ to $C_4$-alkoxy, carboxyl, a carboxylic acid alkyl ester which has 1 to 4 C atoms, a carbon-amide group which is optionally substituted by 1 or 2 $C_1$ to $C_4$-alkyl radicals, a sulphonamide group which is optionally substituted by 1 or 2 $C_1$ to $C_4$-alkyl radicals, alkylsulphonyl having 1 to 4 C atoms, phenylsulphonyl or a cyano, trifluoromethyl, acetyl or benzoyl group, A represents a radical of the formula

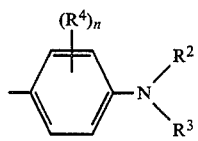

in which $R^2$ and $R^3$ independently of one another represent an alkyl radical which has 1 to 4 C atoms and is optionally substituted by hydroxyl, $C_1$ to $C_4$-alkoxy, halogen, cyano, phenyl, carboalkoxy having 1 to 4 C atoms, carbon-amido, acyloxy, benzyloxy, sulphonamido or acylamino, $R^2$ additionally represents a phenyl or benzyl radical which is optionally substituted by halogen, $C_1$ to $C_4$-alkyl or $C_1$ to $C_4$-alkoxy, or, together with the adjacent C atom of the benzene ring, can form a partially hydrogenated 5-membered or 6-membered ring which contains N and optionally contains O, and $R^4$ denotes hydrogen, an alkyl radical having 1 to 4 C atoms, an alkoxy radical having 1 to 4 C atoms or halogen, or A represents a radical of the formula

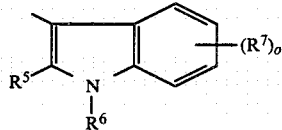

in which $R^5$ represents an alkyl radical having 1 to 4 C atoms, a phenyl radical which is optionally substituted by halogen, $C_1$ to $C_4$-alkyl or $C_1$ to $C_4$-alkoxy, or a carboalkoxy radical having 1 to 4 C atoms, $R^6$ represents hydrogen, an alkyl radical which has 1 to 4 C atoms and is optionally substituted by hydroxyl, halogen, alkoxy having 1 to 4 C atoms, cyano or acyloxy, and $R^7$ represents hydrogen, halogen, $C_1$ to $C_4$-alkyl, $C_1$ to $C_4$-alkoxy, carboalkoxy having 1 to 4 C atoms, $C_1$ to $C_4$-alkylsulphonyl, phenylsulphonyl, acetyl or benzoyl, or A represents a radical of the formula

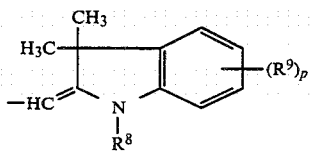

in which $R^8$ and $R^9$ independently of one another have the same meaning as R and $R^1$, and in which X represents the radical of an inorganic acid and the indices m, n, o and p independently of one another denote 1 to 4, by subjecting a compound of the formula

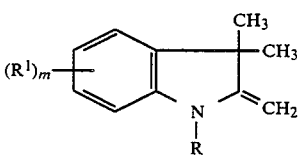

wherein

R, $R^1$ and m have the meaning indicated above, to a condensation reaction with a compound of the formula

A—CHO in which A has the meaning indicated above, and with acids, the improvement which comprises carrying out the condensation reaction by homogeneously mixing the reactants as a viscous melt with 1 to 5 equivalents of a strong inorganic acid or acid salt thereof in the presence of up to 15% by weight of water based on the total weight of the organic starting components, and removing substantially all water present.

2. Process according to claim 1 for the preparation of cationic methine dyestuffs of the general formula

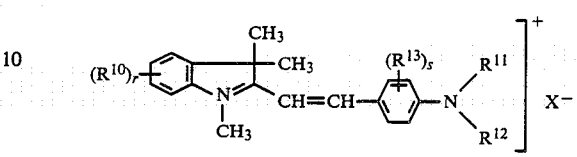

in which $R^{10}$ represents hydrogen, chlorine, methyl, methoxy, ethoxy or carbomethoxy, $R^{11}$ and $R^{12}$ independently of one another represent an alkyl radical which has 1 to 4 C atoms and is optionally substituted by hydroxyl, methoxy, ethoxy, chlorine, cyano, phenyl or acyloxy, and $R^{11}$ additionally indicates a phenyl radical which is optionally substituted by chlorine, methyl or methoxy, or, together with the adjacent C atom of the benzene ring, can form a 5-membered or 6-membered partially hydrogenated ring which contains N and optionally contains O, $R^{13}$ denotes hydrogen, methyl, chlorine, methoxy or ethoxy, r and s denote 1 or 2 and X has the same meaning as in claim 1, by subjecting a compound of the formula

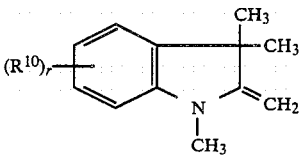

wherein $R^{10}$ and r have the meaning indicated above, to a condensation reaction with equimolecular quantities of a compound of the formula

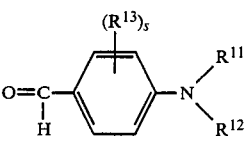

wherein $R^{11}$, $R^{12}$, $R^{13}$ and s have the abovementioned meaning, and with 1 to 5 equivalents of an inorganic acid or salt thereof.

3. Process according to claim 1, characterised in that the condensation reaction is carried out in the absence of an organic solvent.

4. Process according to claim 1, characterised in that a phosphoric acid is employed as the inorganic acid.

5. Process according to claim 1, wherein an acid salt of a phosphoric acid is employed in the condensation.

* * * * *